(12) United States Patent
Moy et al.

(10) Patent No.: US 7,407,997 B2
(45) Date of Patent: Aug. 5, 2008

(54) ALKYL-ARYL OLIGOMERIC PHOSPHATE ESTER AND POLYMERIC PLASTICIZER BLENDS FOR VINYL RESINS

(75) Inventors: Paul Y. Moy, Fishkill, NY (US); Lambertus A. DeKleine, Hengelo (NL)

(73) Assignee: Supresta LLC, Ardsley, NY (US)

( * ) Notice: Subject to any disclaimer, the term of this patent is extended or adjusted under 35 U.S.C. 154(b) by 380 days.

(21) Appl. No.: 11/264,961

(22) Filed: Nov. 2, 2005

(65) Prior Publication Data

US 2006/0194904 A1 Aug. 31, 2006

Related U.S. Application Data

(63) Continuation-in-part of application No. PCT/US2004/013447, filed on Apr. 30, 2004.

(60) Provisional application No. 60/467,412, filed on May 2, 2003.

(51) Int. Cl.
*C08K 5/521* (2006.01)

(52) U.S. Cl. ........................ 524/117; 524/140; 524/141; 524/569

(58) Field of Classification Search ................. 524/117, 524/140, 141, 569
See application file for complete search history.

(56) References Cited

U.S. PATENT DOCUMENTS

| 3,941,908 A | 3/1976 | Valia et al. |
| 4,032,498 A | 6/1977 | Dany et al. |
| 4,133,794 A | 1/1979 | Lamb |
| 4,343,732 A | 8/1982 | Zama et al. |
| 2005/0106967 A1* | 5/2005 | Suzuki .................... 422/86 |

FOREIGN PATENT DOCUMENTS

WO 2004/000925 12/2003

\* cited by examiner

*Primary Examiner*—Peter Szekely
(74) *Attorney, Agent, or Firm*—Dilworth & Barrese, LLP

(57) ABSTRACT

A vinyl chloride polymer composition that contains a mixture of an alkylene-bridged bisphosphate composition, as a fire retardant, and a polyester plasticizer, which is the reaction product of an aliphatic diol and a dicarboxylic acid.

10 Claims, No Drawings

ALKYL-ARYL OLIGOMERIC PHOSPHATE ESTER AND POLYMERIC PLASTICIZER BLENDS FOR VINYL RESINS

CROSS-REFERENCE TO RELATED APPLICATIONS

The present application is a continuation-in-part application of co-pending PCT application Ser. No. PCT/US2004/013447 filed April 30, 2004 and which claims priority from co-pending U.S. provisional application Ser. No. 60/467,412 filed May 2, 2003.

BACKGROUND OF THE INVENTION

Blends of certain polymeric plasticizers with an alkylene-bridged aryl bis-phosphate compositions have shown low levels of smoke generation and of heat release rate as measured in combustion studies.

Additives which act as flame retardants can contribute significantly to smoke generation because they decrease the efficiency of the fuel source and as a result, create a sooty combustion. It has been found that blends of an alkylene-bridged aryl bis-phosphate and a polymeric plasticizer contribute significantly to flame retardancy while maintaining a very low level of smoke evolution.

SUMMARY OF THE INVENTION

A series of plasticizers were blended together in a vinyl composite formulation and measured for flammability, smoke generation by the use of cone calorimetry, UL FR protocol (UL-94) and limited oxygen index. It was found that certain blends showed unique levels of flame and smoke reduction. Superior properties were seen using mixtures of a polymeric-based plasticizer and an alkylene-bridged bis-phosphate. The organic phosphate flame-retardant has the formula: (1)

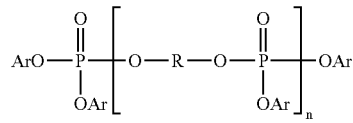

wherein Ar is an aryl or an alkaryl group, R represents, a linear or branched alkylene bridging group having 2 to about 15 carbon atoms, optionally interrupted by at least one etheric oxygen atom, and n can range from 1 to about 10. Representative alkylene bridging groups within the scope of formula (1) above include —$(CH_2)_2$-, —$(CH_2)_4$-, —$(CH_2)_5$-, —$CH_2C(CH_3)_2CH_2$-, —$(CH_2)_6$-, —$(CH_2)_8$-, —$(CH_2)_{12}$-, —$CH_2CH_2OCH_2CH_2$-, —$CH_2CH_2OCH_2CH_2OCH_2CH_2$- and $CH_2C(CH_2)_2CH_2$-.

Generally speaking, this component can be present in the polymer at from about one to about 120 parts by weight of this component for 100 parts by weight of the vinyl resin, more typically from about 5 to about 70 parts by weight.

DESCRIPTION OF THE PREFERRED EMBODIMENTS

The plasticizer is a polyester plasticizer of the type described in U.S. Pat. No. 5,576,367, which is incorporated herein in its entirety (especially the description at Col. 2, line 65 to Col. 3, line 10). This type of plasticizer is the reaction product of an aliphatic diol, such as 1,4-butanediol, and a dicarboxylic acid, such as glutaric and/or azelaic acid(s). A preferred, commercially available plasticizer of this type is available as EDENOL 9779 which is formed from a reaction mixture comprising about 41.4 mole% 1,4-butanediol and about 41.4 mole% of an equimolar mixture of glutaric and azelaic acids.

Generally speaking, this component can be present in the polymer at from about 5 parts by weight to about 120 parts by weight for every 100 parts by weight of vinyl resin. The weight ratio of flame retardant component to the plasticizer can generally range from about 5:1 to about 1:5.

When evaluated at plasticizer levels of fifty parts per hundred vinyl resin (phr), simple mixtures of 1:1 and 2:1 phosphate ester to polymeric (azelate), respectively, performed exceptionally well when compared to combinations of other phosphate esters, other polymerics and trimellitate plasticizers in similar FR vinyl composites.

Specific organic phosphate flame retardants within the scope of the above formula (I) include butyl bis(diphenyl phosphate), pentyl bis (diphenyl phosphate), neopentylene bis(diphenyl phosphate), hexyl bis(diphenyl phosphate), octyl bis(diphenyl phosphate), dodecyl bis(diphenyl phosphate), ethylene glycol bis(diphenyl phosphate), di-ethylene glycol bis(diphenyl phosphate), tri-ethylene glycol bis (diphenyl phosphate) and the reaction product of diphenyl chlorophosphate and pentaerythnitol.

EXPERIMENTAL:

The following formulations were prepared on the Haake bowl mixer, were processed at 165° C. for five minutes and were then compression molded to the test specifications (1.6 mm thickness). Flammability was measured using three different protocols: UL-94-VO; ASTM-2863- Limited Oxygen Index (LOI); and ASTM-1354-90, Cone Calorimetry. Physical properties were also measured by standard practices, ASTM 638, Tensile Properties of Plastics.

These formulations studied the effects of plasticizer blends. The vinyl composites varied in the mixing ratios of the neopentylene-bridged bis-phosphate ("NDP") with a "blending. plasticizer". The composites contain one "plasticizer" (neat), a 1:1, or 2:1 weight ratio (NDP: secondary plasticizer). All released easily from the molding platens (1.6 mm thickness-molded at 375° F). Sample specimens were cut to test specifications, conditioned in a constant temperature and humidity room and evaluated per protocol design.

TABLE #1

| | Formulations | | | | | | | | | | | | | |
|---|---|---|---|---|---|---|---|---|---|---|---|---|---|---|
| | Formulation # | | | | | | | | | | | | | |
| | 1 | 2 | 3 | 4 | 5 | 6 | 7 | 8 | 9 | 10 | 11 | 12 | 13 | 14 |
| PVC | 100 | 100 | 100 | 100 | 100 | 100 | 100 | 100 | 100 | 100 | 100 | 100 | 100 | 100 |
| $CaCO_3$ | 10 | 10 | 10 | 10 | 10 | 10 | 10 | 10 | 10 | 10 | 10 | 10 | 10 | 10 |
| ATH (Hydral 710) | 30 | 30 | 30 | 30 | 30 | 30 | 30 | 30 | 30 | 30 | 30 | 30 | 30 | 30 |

TABLE #1-continued

Formulations

| | Formulation # | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Zinc Borate | | 6 | 6 | 6 | 6 | 6 | 6 | 6 | 6 | 6 | 6 | 6 | | 6 |
| AOM | | 6 | 6 | 6 | 6 | 6 | 6 | 6 | 6 | 6 | 6 | 6 | | 6 |
| NDP | 50 | 50 | 25 | 37.5 | 25 | 37.5 | 25 | 37.5 | 25 | 37.5 | 25 | 37.5 | | |
| TOTM | | | 25 | 12.5 | | | | | | | | | | |
| XP-1891 | | | | | 25 | 12.5 | | | | | | | | |
| Santicizer 2148 | | | | | | | 25 | 12.5 | | | | | | |
| Santicizer 148 | | | | | | | | | 25 | 12.5 | | | | |
| Edenol 9779 | | | | | | | | | | | 25 | 12.5 | 50 | 50 |
| ESO | 5 | 5 | 5 | 5 | 5 | 5 | 5 | 5 | 5 | 5 | 5 | 5 | 5 | 5 |
| Halthal | 5 | 5 | 5 | 5 | 5 | 5 | 5 | 5 | 5 | 5 | 5 | 5 | 5 | 5 |
| BZ-4975 | 5 | 5 | 5 | 5 | 5 | 5 | 5 | 5 | 5 | 5 | 5 | 5 | 5 | 5 |
| Totals: | 205 | 217 | 217 | 217 | 217 | 217 | 217 | 217 | 217 | 217 | 217 | 217 | 205 | 217 |

PVC - Geon 103EP (Geon)
ATH - alumina trihydrate (ALCOA, Hydral 710)
Zinc borate - (U.S. Borax, Firebrake 2335)
AOM - ammonium octylmolybdate, (PAG)
NDP - neopentylene bis-diphenylphosphate
TOTM - trioctyl trimellitate (Velsicol)
XP-1891 - polymeric plasticizer (Velsicol)
Santicizer 148 - isodecyldiphenyl phosphate (Ferro)
Santicizer 2148 - alkyl diphenylphosphate (Ferro)
Edenol 9779 - polymeric plasticizer (Cognis)
ESO - Epoxidized soya oil (AKCROS)
Halthal - lead stabilizer, (Halstab)
BZ-4975 - metal soap stabilizer (AKCROS)

By simple flammability measurements, these vinyl composites were tested for LOI and UL-94 vertical flammability (V0). As one would expect, composites containing only the phosphate ester ("NDP") as the plasticizing agent showed the best overall flammability performance (as exhibited by the higher LOI and excellent UL-94 results). Conversely, EDENOL 9779 polymeric plasticizer, which contains neither phosphorus nor halogen to effect flame resistance, showed the worst flammability characteristics in both test protocols with the lowest LOI value (minimum $O_2$ percent necessary to sustain ignition) and also the highest UL-94 after flame time (AFT—time of sustained combustion after ignition source is remove). The UL-94 testing also showed a slight loss of FR rating when EDENOL 9779 plasticizer (Formulation # 14) was mixed with smoke suppressants and char formers (AOM & zinc borate). Because of the high flame times, this composite dropped to an UL-94 V1 rating (one or more ignition times greater than ten seconds).

TABLE #2

Formulations: UL-94 & LOI Evaluations

| | Formulation # | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| PVC | 100 | 100 | 100 | 100 | 100 | 100 | 100 | 100 | 100 | 100 | 100 | 100 | 100 | 100 |
| CaCO$_3$ | 10 | 10 | 10 | 10 | 10 | 10 | 10 | 10 | 10 | 10 | 10 | 10 | 10 | 10 |
| ATH (Hydral 710) | 30 | 30 | 30 | 30 | 30 | 30 | 30 | 30 | 30 | 30 | 30 | 30 | 30 | 30 |
| Zinc Borate | | 6 | 6 | 6 | 6 | 6 | 6 | 6 | 6 | 6 | 6 | 6 | | 6 |
| AOM | | 6 | 6 | 6 | 6 | 6 | 6 | 6 | 6 | 6 | 6 | 6 | | 6 |
| NDP | 50 | 50 | 25 | 37.5 | 25 | 37.5 | 25 | 37.5 | 25 | 37.5 | 25 | 37.5 | | |
| TOTM | | | 25 | 12.5 | | | | | | | | | | |
| VCC XP-1891 | | | | | 25 | 12.5 | | | | | | | | |
| Santicizer 2148 | | | | | | | 25 | 12.5 | | | | | | |
| Santicizer 148 | | | | | | | | | 25 | 12.5 | | | | |
| Edenol 9779 | | | | | | | | | | | 25 | 12.5 | 50 | 50 |
| ESO | 5 | 5 | 5 | 5 | 5 | 5 | 5 | 5 | 5 | 5 | 5 | 5 | 5 | 5 |
| Halthal | 5 | 5 | 5 | 5 | 5 | 5 | 5 | 5 | 5 | 5 | 5 | 5 | 5 | 5 |
| BZ-4975 | 5 | 5 | 5 | 5 | 5 | 5 | 5 | 5 | 5 | 5 | 5 | 5 | 5 | 5 |
| Totals: | 205 | 217 | 217 | 217 | 217 | 217 | 217 | 217 | 217 | 217 | 217 | 217 | 205 | 217 |
| LOI: (1.6 mm) | 33 | 34 | 30 | 30.5 | 30.5 | 30.5 | 30 | 30.5 | 30.5 | 31 | 31.5 | 32 | 27.5 | 30 |
| UL-94 (1.6 mm) | V-0 | V-0 | V-0 | V-0 | V-0 | V-0 | V-0 | V-0 | V-0 | V-0 | V-0 | V-0 | V-0 | V-1 |
| (AFT) | 0 | 0 | 0.1 | 0.1 | 0.1 | 0.1 | 0.1 | 0.1 | 0.1 | 0.1 | 0.1 | 0.1 | 0.1 | 3.9 |

Cone Calorimetry:

Cone calorimetry further describes the flammability of these composites. The ignition source differs from the other flammability tests in that the cone decomposes the specimen through radiant heat (cone shaped mantel), and the ignition of the evolved combustible gases is done by an electrical piezo-igniter (both the UL-94 and LOI protocols use an open flame rather than radiant heat). Testing of these mixtures reveals significant synergy between the EDENOL 9779 plasticizer and NDP. The cone tests were preformed on an Atlas cone calorimeter under a heat flux of 50 kW/m$^2$.

At equivalent ratios of NDP with the blending plasticizer, mixtures containing both NDP and the EDENOL 9779 plasticizer showed significant decrease in smoke generation (superior to smoke values of the compounds with the individual components—reference table 3). These low smoke values were achieved while maintaining low combustion values (as seen in suppression of the peak heat release point). Similarly, NDP and the EDENOL 9779 plasticizer, neat and with smoke suppressants, did not reduce smoke values as efficiently.

TABLE #3

NDP/Polymeric Blends

| Formulation Reference: | | 1 | 2 | 11 | 12 | 13 | 14 | 5 | 6 |
|---|---|---|---|---|---|---|---|---|---|
| Plasticizer | | NDP | NDP, FRs | NDP | NDP | 9779 | 9779, FR | NDP | NDP, FR |
| 2nd Plasticizer | | Neat | neat | 9779 | 9779 | Neat | Neat | XP1891 | XP1891 |
| Ratio | | — | — | 1/1 | 2/1 | — | — | 1/1 | 2/1 |
| Peak HRR | kW/m$^2$ | 172.7 | 130.3 | 194.1 | 158.1 | 224 | 208.9 | 189.4 | 199 |
| Avg. HRR | kW/m$^2$ | 83.9 | 69.7 | 98.9 | 96.9 | 72 | 76.9 | 83.7 | 91.3 |
| Avg. HRR - T60 | kW/m$^2$ | 114.3 | 94.5 | 136.6 | 111 | 138.2 | 138.9 | 127.7 | 132 |
| Avg. HRR - T180 | kW/m$^2$ | 99.4 | 90.4 | — | — | 106.3 | 99.5 | 99 | 104 |
| Avg. HRR - T300 | kW/m$^2$ | 0 | — | — | — | 76.3 | — | — | — |
| Total Heat: | kW/m$^2$ | 20.5 | 21.23 | 14 | 10.7 | 23.5 | 21.3 | 20.4 | 21.3 |
| Avg. Effective HOC: | MJ/m$^2$ | 17.23 | 19.5 | 14.4 | 11.6 | 19.5 | 19.7 | 19.1 | 19.8 |
| Smoke | m$^2$/kg | 806.2 | 582 | 556 | 487 | 719 | 500 | 693 | 671 |
| Avg. % Loss Rate: | g/s * m2 | 9.89 | 7.76 | 12.8 | 14.4 | 8 | 8.73 | 9.85 | 10.2 |
| Avg. % Loss | % | 82.2 | 69.1 | 60.2 | 56 | 80 | 70.2 | 69 | 68.5 |
| Avg. CO Yield: | kg/kg | 0.112 | 0.058 | 0.0837 | 0.0648 | 0.09 | 0.0795 | 0.062 | 0.078 |
| Avg. CO$_2$ Yield: | kg/kg | 0.833 | 1.056 | 0.6751 | 0.475 | 0.946 | 1.034 | 1.015 | 1.023 |
| Time to Ignition: | Seconds | 24.6 | 21.8 | 21 | 21.7 | 21.2 | 20.3 | 19.2 | 20.5 |

Cone Data: 50 kW/m$^2$ heat flux
HRR - Heat Release Rate
Avg. HRR - T60 - Avg. heat release rate after 60 seconds
Avg. HRR - T180 - Avg. heat release rate after 180 seconds
Avg. HRR - T300 - Avg. heat release rate after 300 seconds
Total heat: cumulative heat energy evolved
Smoke - Light obscuration per mass
Time to ignition - time in seconds to initiate flaming characteristics NDP Blends with Other Phosphate Esters Further cone testing of the plasticizer blends showed the effectiveness of NDP blended with the EDENOL 9779 product as compared to blends with other phosphate esters: including SANTICIZER 148 isodecyl diphenyl phosphate ester, which is commonly used for low smoke applications; and SANTICIZER 2148 alkyl diphenyl phosphate, another low smoke FR plasticizer, which is similar to SANTICIZER-148, but with a straight chain aliphatic alkyl group. Combinations of these phosphate esters with NDP demonstrated low smoke values, but not as low as the NDP/EDENOL 9779 plsasticizer mixtures. Both ratios of 1:1 and 2:1 NDP/EDENOL 9779 plasticizer were found to generation-significantly lower smoke values than similarly compounded vinyl samples containing the SANTICIZER brand plasticizers. Despite the lower smoke values of the NDP/EDENOL 9779 compounds, cone evaluations also demonstrated the superior low flammability properties of these combinations.

TABLE #4

NDP/Phosphate Ester blends

| | | Formulation # | | | | |
|---|---|---|---|---|---|---|
| | | 11 | 12 | 9 | 10 | 7 |
| | | Plasticizer | | | | |
| | | NDP | NDP | NDP | NDP | NDP |
| | | | | 2nd Plasticizer | | |
| | | C-9779 | C-9779 | 148 | 148 | 2148 |
| | | Ratio | | | | |
| | | 1/1 | 2/1 | 1/1 | 2/1 | 1/1 |
| Peak HRR | kW/m² | 194.1 | 158.1 | 226.8 | 199.6 | 223.7 |
| Avg. HRR | kW/m² | 98.9 | 96.9 | 105.6 | 104 | 105.1 |
| Avg. HRR - T60 | kW/m² | 136.6 | 111 | 149.5 | 138.8 | 150.4 |
| Avg. HRR - T180 | kW/m² | — | — | 114.6 | 109.5 | 113.2 |
| Avg. HRR - T300 | kW/m² | — | — | — | — | — |
| Total Heat: | kW/m² | 14 | 10.7 | 21.7 | 20.7 | 21.4 |
| Avg. Effective HOC: | MJ/m² | 14.4 | 11.6 | 20.4 | 20.2 | 20.7 |
| Smoke | m²/kg | 556 | 487 | 839 | 754 | 760 |
| Avg. % Loss Rate: | g/s * m2 | 12.8 | 14.4 | 11.35 | 10.8 | 11.3 |
| Avg. % Loss | % | 60.2 | 56 | 69.5 | 66.6 | 68.8 |
| Avg. CO Yield: | kg/kg | 0.0837 | 0.0648 | 0.0808 | 0.0777 | 0.0834 |
| Avg. CO₂ Yield: | kg/kg | 0.6751 | 0.475 | 0.987 | 1.069 | 6 |
| Time to Ignition: | Seconds | 21 | 21.7 | 17.8 | 20.5 | 18.1 |

Cone Data: 50 kW/m² heat flux

NDP Blends with Trimellitates

Further comparisons to plasticizers useful in wire and cable applications, such as the trimellitates, were also made. One common grade of this plasticizer type is trioctyl trimellitate (TOTM). Blends of NDP/TOTM were evaluated in the cone calorimeter and the results show the NDP/EDENOL 9779 plasticizer blend to be superior in both low smoke generation and also better flame resistance (see Table #5, below).

TABLE #5

NDP/TOTM Blends

| | | Formulation # | | | |
|---|---|---|---|---|---|
| | | 11 | 12 | 3 | 4 |
| | | Plasticizer | | | |
| | | NDP | NDP | NDP | NDP |
| | | | | 2nd Plasticizer | |
| | | C-9779 | C-9779 | TOTM | TOTM |
| | | Ratio | | | |
| | | 1/1 | 2/1 | 1/1 | 2/1 |
| Peak HRR | kW/m² | 194.1 | 158.1 | 201 | 169 |
| Avg. HRR | kW/m² | 98.9 | 96.9 | 96.3 | 78.6 |
| Avg. HRR - T60 | kW/m² | 136.6 | 111 | 134 | 121.6 |
| Avg. HRR - T180 | kW/m² | — | — | 104.8 | 97.7 |
| Avg. HRR - T300 | kW/m² | — | — | — | — |
| Total Heat: | kW/m² | 14 | 10.7 | 20.5 | 21.1 |
| Avg. Effective HOC: | MJ/m² | 14.4 | 11.6 | 20.1 | 19.8 |
| Smoke | m²/kg | 556 | 487 | 748 | 734 |
| Avg. % Loss Rate: | g/s * m2 | 12.8 | 14.4 | 10.11 | 8.71 |
| Avg. % Loss | % | 60.2 | 56 | 68.4 | 68.5 |
| Avg. CO Yield: | kg/kg | 0.0837 | 0.0648 | 0.07 | 0.0725 |
| Avg. CO₂ Yield: | kg/kg | 0.6751 | 0.475 | 0.99 | 1.0735 |
| Time to Ignition: | seconds | 21 | 21.7 | 19.1 | 19.3 |

Cone Data: 50 kW/m² heat flux

The previous Examples, since they merely illustrate certain embodiments of the present invention should not be construed in a limiting sense. The scope of protection sought is set forth in the Claims that follow.

We claim:

1. A vinyl chloride polymer composition that comprises a mixture of an alkylene-bridged bisphosphate composition, as a fire retardant, and a polyester plasticizer, which is the reaction product of an aliphatic diol and a dicarboxylic acid.

2. A composition as claimed in claim 1 wherein the alkylene-bridged bisphosphate composition comprises neopentylene bis(diphenyl phosphate).

3. A composition as claimed in claim 1 wherein the polyester plasticizer is the reaction product of 1,4-butanediol and a mixture of glutaric and azelaic acid.

4. A composition as claimed in claim 1 wherein the alkylene-bridged bisphosphate composition comprises neopentylene bis(diphenyl phosphate) and the polyester plasticizer is the reaction product of 1,4-butanediol and a mixture of glutaric and azelaic acids.

5. A composition as claimed in claim 1 wherein the alkylene-bridged bisphosphate composition comprises neopentylene bis(diphenyl phosphate) and the polyester plasticizer is the reaction product of 1,4-butanediol and an equimolar mixture of glutaric and azelaic acids.

6. A vinyl chloride polymer composition that comprises a mixture of from about 5 to about 70 parts by weigh weight of an alkylene-bridged bisphosphate composition, as a fire retardant, and from about 5 to about 120 of a polyester plasticizer, which is the reaction product of an aliphatic diol and a dicarboxylic acid, all weight amounts being based on 100 parts by weight or vinyl chloride polymer.

7. A composition as claimed in claim 6 wherein the alkylene-bridged bisphosphate composition comprises neopentylene bis(diphenyl phosphate).

8. A composition as claimed in claim 6 wherein the polyester plasticizer is the reaction product of 1,4-butanediol and a mixture of glutaric and azelaic acid.

9. A composition as claimed in claim 6 wherein the alkylene-bridged bisphosphate composition comprises neopentylene bis(diphenyl phosphate) and the polyester plasticizer is the reaction product of 1,4-butanediol and a mixture of glutaric and azelaic acids.

10. A composition as claimed in claim 6 wherein the alkylene-bridged bisphosphate composition comprises neopentylene bis(diphenyl phosphate)and the polyester plasticizer is the reaction product of 1,4-butanediol and an equimolar mixture of glutaric and azelaic acids.

* * * * *